350-433 SR

XR 3,780,267

United States

Hagelbarger et al.

[11] 3,780,267

[45] Dec. 18, 1973

[54] OPTICAL TAPE READER USING CYLINDRICAL LENS AS TAPE DRIVE WHEEL

[75] Inventors: David William Hagelbarger, Morris Township, Morris County; Peter Steve Kubik, South Plainfield, both of N.J.

[73] Assignee: Bell Telephone Laboratories, Incorporated, Berkeley Heights, N.J.

[22] Filed: May 23, 1972

[21] Appl. No.: 256,089

[52] U.S. Cl. 235/61.11 E, 179/100.3 L, 250/219 D, 350/190

[51] Int. Cl. .......... G02b 3/06, G06k 7/10

[58] Field of Search .......... 235/61.11 E; 235/61.1; 350/96 B, 190; 250/219 D, 219 DC; 179/100.3 L; 226/196

[56] References Cited

UNITED STATES PATENTS

| | | | |
|---|---|---|---|
| 3,430,033 | 2/1969 | Reed | 235/61.11 E |
| 3,386,654 | 6/1968 | Wallace | 235/61.1 |
| 1,713,726 | 5/1929 | Vogt et al. | 179/100.3 L |
| 1,486,226 | 3/1924 | Capstaff et al. | 235/61.11 E |
| 2,493,056 | 1/1950 | Bartelson | 179/100.3 L |
| 2,093,490 | 9/1937 | Schwarz | 235/61.11 E |
| 2,130,561 | 9/1938 | Pratt | 350/190 |
| 3,549,827 | 12/1970 | Willcox et al. | 350/190 UX |
| 3,693,019 | 9/1972 | Grenda et al. | 250/219 D |

OTHER PUBLICATIONS

IBM Tech. Discl. Bulletin, Battison et al., "Perforated Tape Reader," Vol. 4, No. 3, 8/1961, p. 20.

*Primary Examiner*—Thomas J. Sloyan
*Attorney*—W. L. Keefauver et al.

[57] ABSTRACT

A device is described for electrooptically reading the holes in a punched record tape. A highly polished transparent wheel is utilized as the tape drive mechanism. Two pressure rollers located on opposite sides of this wheel along with beveled edges on the rim thereof maintain the record tape in proper alignment as it passes under photoelectric detection circuitry. A source of light is located below the transparent wheel and diametrically opposite the photodetection circuitry. The hub of the transparent drive wheel acts as a cylindrical lens to focus the light on the photodetectors. By detecting the amount of light transmitted through the record tape, the presence or absence of holes therein is ascertained and the information represented thereby is recovered.

8 Claims, 7 Drawing Figures

OPTICAL TAPE READER USING CYLINDRICAL LENS AS TAPE DRIVE WHEEL

BACKGROUND OF THE INVENTION

1. Field of the Invention

This invention relates to punched record tape reading devices and, in particular, to those devices which employ electrooptical techniques to sense the hole pattern in the record tape.

2. Description of the Prior Art

In numerous applications certain types of control information are fed to a processing unit through the medium of punched record tapes. The information is stored on such tapes by means of the unique hole patterns punched therein. To recover this stored information a wide variety of reading devices have been designed. Generally, these devices can be classified as belonging to one of two basic types.

The first type of reading device employs an array of spring loaded mechanical sensing fingers or read-out pins. As the perforated record tape passes over this array of read-out pins the presence of a hole, and therefore information, is sensed by the opening or closing of a microswitch located at the opposite end of each such pin. By coupling the output from each microswitch through an appropriate logic network the control signal in proper format can be obtained.

In the second type of reading device the read-out pin-microswitch combination is replaced with a photoelectric equivalent. A source of light is provided on one side of the record tape and on the opposite side is an array of light detecting circuits. The presence of a hole is signified when light from the source is transmitted through the hole and is detected by the light detection circuitry.

In each of these two types of device, the tape is characteristically drawn across the reading aperture by means of a sprocket-type drive wheel. The teeth on the sprocket engage the row of holes specifically punched in the record tape for this purpose and the sprocket rotation pulls the tape past the reading station. Generally, the tape is positioned between pins or posts such that it remains aligned with respect to the mechanical or optical apparatus arranged to be sensitive to the existence or nonexistence of holes in the record tape.

Recent evidence suggests that the density of the holes in the record tape may vary abruptly from any one segment of the tape to any other. For example, in a standard ASCII (American Standard Code for Information Interchange) code, the hole pattern representing the digits zero through nine usually results in more holes to one side of center than to the other. Because of this unequal distribution of punched holes, the center of mass of the record tape varies as the tape is drawn across the reading aperture.

This variation in the center of mass of the record tape causes it to slide laterally bringing it into contact with the alignment pins used to position the tape. The alignment of the drive sprocket with respect to the drive holes in the tape is also adversely affected by this lateral motion. The record tape, generally being made of paper, is a good abrasive and tends to cut into the alignment pins and to cause added wear on the drive sprocket. The resultant damage allows the tape to move even more in a lateral direction until either the hole pattern is no longer in alignment with the sensing apparatus or the alignment pins themselves are destroyed. In either case, expensive and time consuming mechanical repairs would have to be effected in order to restore the punched record tape reading device to a usable condition.

Accordingly, one object of the present invention is to eliminate guide-pin maintenance problems.

Another object is to reduce the potentially large number of errors resulting from the misalignment of the record tape as it passes the hole pattern sensors.

A further object is to simplify the mechanical tape drive mechanism:

A still further object is to eliminate potential tape damage resulting from the mechanical drive mechanism.

A still further object is to provide a portable tape reading device which can be operated under less than ideal operating conditions.

SUMMARY OF THE INVENTION

The foregoing and other objects of the invention are realized in an illustrative embodiment wherein the record tape to be read is urged into frictional contact with a transparent drive wheel by means of two pressure rollers. The drive wheel then transports the tape past a reading aperture where an array of photodetecting circuits senses the presence or absence of holes in the tape. Since the drive wheel is transparent, a source of light can be located external to the wheel, but diametrically opposite the photodetectors, and still provide adequate light to trigger the photodetectors. Moreover, by configuring the drive wheel so that it is comprised of a hub and a rim, and by highly polishing the surface of the hub and the inner and outer surfaces of the rim, an improvement in the quality of light transmission can be effected. This results from the highly polished hub acting as a cylindrical lens to focus the light on the photodetecting circuits.

Accordingly, it is one feature of the invention that the tape drive mechanism and the light focusing element form an integral unit.

Another feature of the invention is that the increased area of frictional contact of the record tape with the drive wheel, in conjunction with the beveled edges on the rim of the drive wheel, prevent any lateral displacement of the tape as it passes under the photodetection circuitry.

Another feature of the invention is that the beveled edges, acting to prevent lateral displacement of the tape, move with the tape thus avoiding abrasive wear.

Still another feature of the invention is that the outside diameter of the transparent drive wheel is approximately one-half the distance between adjacent creases in a standard record tape, and this in conjunction with the pressure differential between the leading and followinG rollers, ensures that a constant tape to sensing circuit gap width can be maintained when the creases in the tape pass under the reading aperture.

Yet another feature is that the tape transport mechanism is adaptable to manual operation.

BRIEF DESCRIPTION OF THE DRAWINGS

The aforementioned features and objects of the invention as well as other features and objects will be better understood upon a consideration of the following detailed description and the appended claims in connection with the attached drawings of an illustrative embodiment in which:

DETAILED DESCRIPTION

Figure 1:
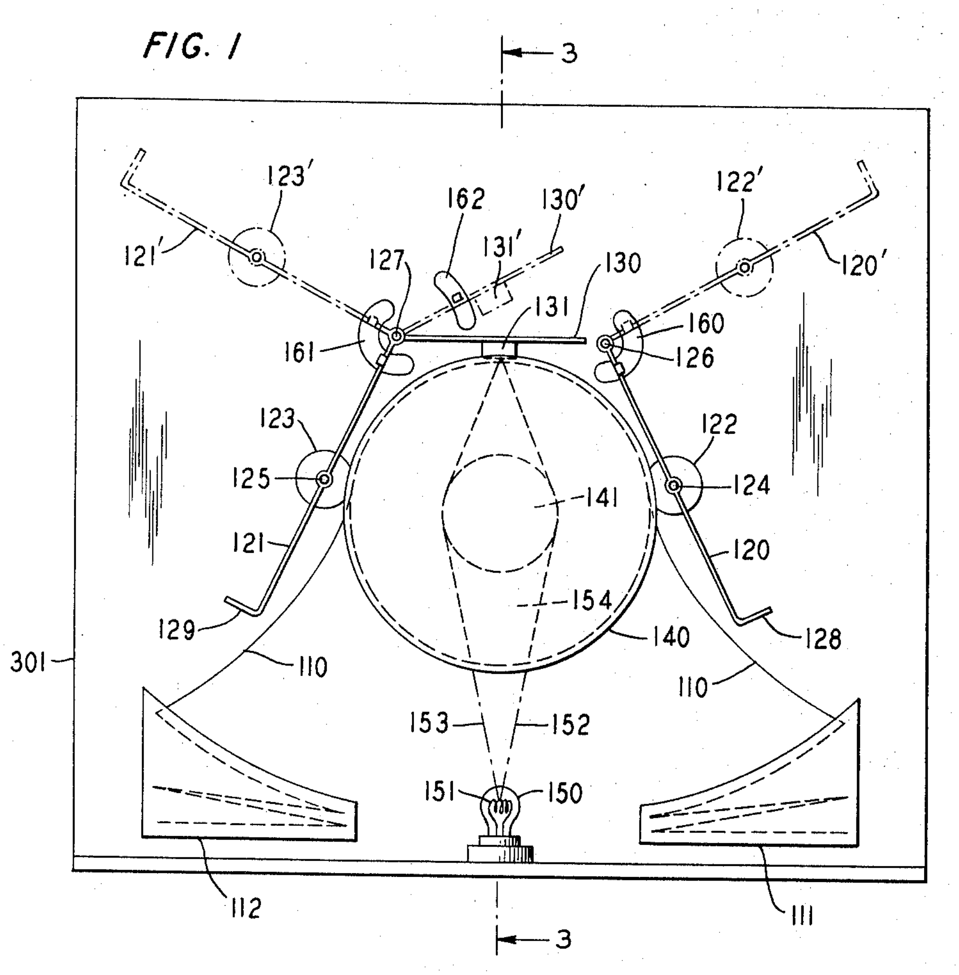
FIG. 1 is a front view of one illustrative form of the present invention.
Figure 3:
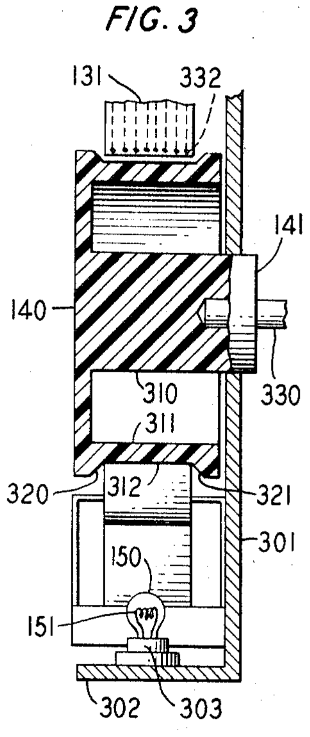
FIG. 3 is a partial side view of the invention shown in FIG. 1 showing the cross-sectional detail of the transparent drive wheel.
Figure 2:
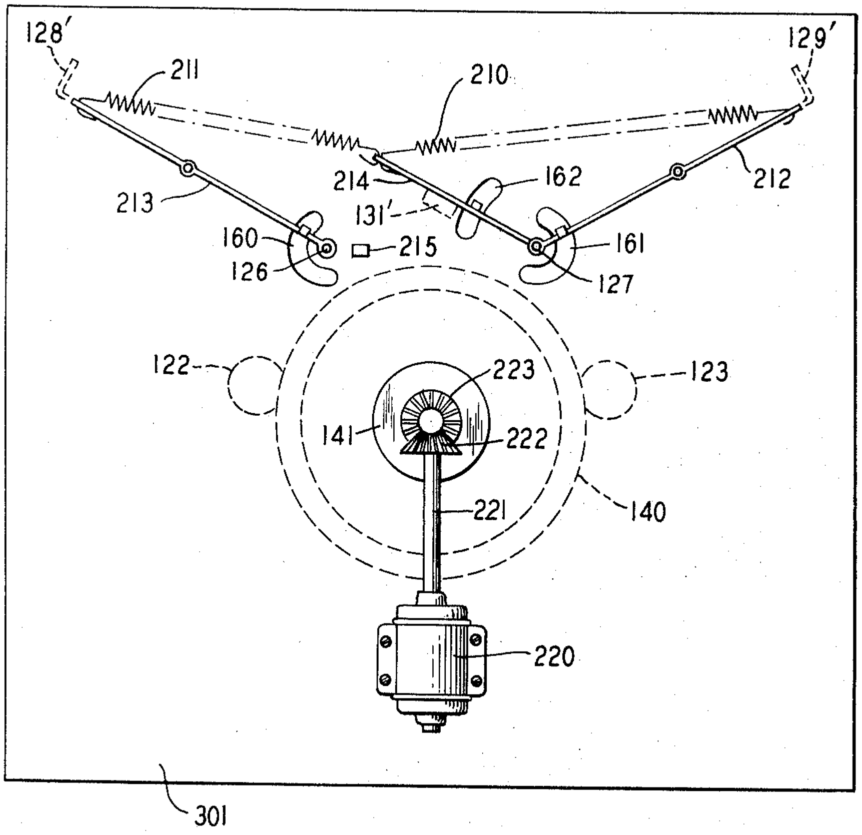
FIG. 2 is a back view of the invention shown in FIG. 1.

The preferred embodiment of the punched record tape reading device is illustrated in FIGS. 1 through 3 of the present drawings. It will be helpful to note that the first numeral of the reference characters designating each element of the invention is indicative of the figure wherein that element is most clearly illustrated. Following this convention the punched record tape reader will be seen to comprise a rotatable transparent drive wheel 140, a light source 150 and a photodetection assembly 130. The record tape is brought into frictional engagement with the driVe wheel 140 by means of a leading pressure roller assembly 120 and a following pressure roller assembly 121. Rotational motion for drive wheel 140 is supplied by an electric motor 220. All of the foregoing elements and assemblies are physically mounted on a frame 301 which includes a base 302.

Tape 110 to be read is inserted into supply bin 111 and manually fed to drive wheel 140. To facilitate the mounting of tape 110, the leading pressure roller assembly 120, the photodetection assembly 130 and the following pressure roller assembly 121 are pivotally mounted to frame 301. Through appropriate mechanical linkages to be described forthwith, leading pressure roller assembly 120, follOwing pressure roller assembly 121 and photodetection assembly 130 have an alternate quiescent state represented by positions wherein these assemblies are designated as 120', 121' and 130', respectively. The two quiescent states will be referred to as raised and lowered positions.

The pressure roller assemblies 120 and 121 and photodetector assembly 130 are rigidly connected to arms 213, 212 and 214, respectively, through frame 301. The connecting linkages extend through apertures 160, 161 and 162, respectively. This arrangement allows springs 210 and 211 to be coupled to the pressure roller assemblies 120 and 121 and facilitates the movement of these assemblies. Leading pressure roller assembly 120, is pivotally connected to frame 301 by pin 126. When leading pressure roller assembly 128 is lifted, spring 211 is expanded to its point of maximum extension. The point of maximum extension occurs between the two quiescent positions. When this point is passed spring 211 contracts and the leading pressure roller assembly 120 is toggled to position 120'. Similarly, the lifting of following pressure roller assembly 121, which is pivotally connected by pin 127 to frame 301, extends spring 210 to its point of maximum extension. When this point is passed no further lifting is necessary as the toggle action of spring 210 completes the movement of following pressure roller assembly 121 to position 121'.

Concurrent with following pressure roller assembly 121 being rotated about pin 127 is the rotation of photodetection assembly 130 about pin 127. This rotation results from springs 210 and 211 each having one end attached to rigid arm 214 of photodetection assembly 130. spring 210, having a tension approximately twice that of spring 211, restrains photodetection assembly 130 from being rotated by the toggle action of the leading pressure roller assembly 120. Consequently, photodetection assembly 130 is rotated to quiescent position 130' by the toggle action of following pressure roller assembly 121 only.

With the area around drive wheel 140 cleared the leader of tape 110 is manually inserted between beveled edges 320 and 321 of drive wheel 140. Take-up bin 112 is provided for the accumulation of tape 110 after it has been read. With tape 110 threaded around drive wheel 140, the leading pressure roller assembly 120 is folded down. The folding down of the leading pressure roller assembly 120 causes rigid arm 213 attached thereto to be rotated about pin 126. Spring 211, having one end attached to arm 213, is put in tension by this rotation, reaches its point of maximum extension, and toggles the leading pressure roller assembly 120 to its quiescent position nearest the periphery of drive wheel 140. Roller 122 is attached to leading pressure roller assembly 120 by pin 124 and it is thereby brought into contact with drive wheel 140. The width of roller 122 is approximately the same as that of tape 110 and that of surface 312 between beveled edges 320 and 321 on the rim of drive wheel 140.

With leading pressure roller assembly 120 in position, tape 110 is pulled taut about the rim of drive wheel 140. Following pressure roller assembly 121 is then folded down. The folding down of following pressure roller assembly 121 causes rigid arm 212 attached thereto to be rotated about pin 127. Spring 210, having one end attached to arm 212 and its other end attached to rigid arm 214 which in turn is attached to photodetection assembly 130, is put in tension by the rotation. When the point of maximum extension of spring 210 is passed, the toggle action completes the rotation. Roller 123 which is attached to the following pressure roller assembly 121 by pin 125 is thereby brought into contact with drive wheel 140. At the same time photodetection assembly 130, having one end of rigid arm 214 attached thereto about pin 127, is rotated downward until it hits stop knob 215. As indicated above the differential in tensions between springs 210 and 211 prevents photodetection assembly 130 from being rotated by the folding down of leading pressure roller assembly 120 to its lowered position.

Through the folding down of following pressure roller assembly 121, photodetector array 131 is brought into close proximity with tape 110 and drive wheel 140 without affecting the rotational motion of drive wheel 140. As was the case with roller 122, roller 123 is approximately the same width as that of tape 110 and that of surface 312 between beveled edges 320 and 321 on the rim of drive wheel 140.

Because of the spatial relationship between rollers 122 and 123 and the width of surface 312 between beveled edges 320 and 321 on the rim of drive wheel 140, the area of physical contact of tape 110 with drive wheel 140 and thP frictional force generated thereby constrains tape 110 from being laterally displaced as it travels under the photodetector array 131. Consequently, the guide pin wear and the resultant maintenance problem associated with prior art devices is eliminated. In addition, the potentially large number of errors resulting from the lateral misalignment of the record tape is significantly reduced.

The tension in spring 211 is set so that it is sufficient to overcome the inertia of tape 110 as it approaches the periphery of drive wheel 140 tangentially. This results in a tension of about 4 inch-pounds in one embodiment. The corresponding tension in spring 210 is about 8 inch-pounds and is set such that it is sufficient to override the centrifugal force imparted to tape 110 by the drive wheel 140 as it rotates. In addition, having the tension in spring 210 approximately twice that in spring 211 enables the leading pressure roller assembly to be folded down from raise position 120′ without affecting the orientation of photodetection assembly 130.

A standard record tape of the variety herein utilized has creases approximately 9 inches apart. By making the diameter of drive wheel 140 approximately one-half the distance between these adjacent creases, the diameter is about 4-½ inches. It should be noted that the drawings have been exaggerated to depict more clearly the construction of the device and, accordingly, are not to scale. Consequently, the diameter of drive wheel 140 does not appear in proportion to the distance between creases in the record tape 110. The combination of the differential spring tensions and the proportioning of the diameter to crease spacing ensures that the creases in tape 110 are held at a fixed distance between photodetection assembly 130 and drive wheel 140 as tape 110 is being read.

The rotational motion for drive wheel 140 is supplied by electric motor 220 driving shaft 221. At the end of shaft 221 is bevel gear 222 which in turn is coupled to bevel gear 223 at the end of shaft 330. Shaft 330 is attached to hub 141 of drive wheel 140 by a pressure fit. Therefore, as electric motor 220 causes shaft 221 to rotate, this rotational motion is imparted to drive wheel 140. Tape 110, being in frictional contact with drive wheel 140, is thereby transported under the photodetector array 131. This arrangement provides a substantial simplification of the tape transport mechanism, and thereby eliminates the potential damage to the tape caused by prior art sprocket-type drive mechanisms.

End 128 of the leading pressure roller assembly 120 and end 129 of the following pressure roller assembly 121 are rounded so as to prevent tape 110 with its numerous perforations from becoming snarled and possibly damaged as it is transported past the photodetector array 131.

Light source 150 is mounted in socket 303 which in turn is attached to base 302 of frame 301. The source 150 is positioned so as to be diametrically opposite to photodetection assembly 130. The actual reading of tape 110 is accomplished by energizIng light source 150 whereby filament 151 gives off a light beam 154 enclosed within bmoken lines 152 and 153. The beam 154 is transmitted through highly polished surfaces 312 and 311 of the rim of drive wheel 140. Upon striking highly polished surface 310 of hub 141, the beam 154 is focused on surface 312 represented as a point just under photodetector array 131 in FIG. 1. The focusing results from hub 141 acting as a cylindrical lens. This focused strip of illumination remains fixed in this position as drive wheel 140 and tape 110 are rotated past it. By detecting with photodetector array 131 the amount of this light, the presence or absence of holes in tape 110 is readily determined. The tape 110 has, in addition to the information carrying holes, drive sprocket holes. These holes are advantageously employed although not for the purpose intended originally. The sprocket holes are smaller than the information holes and are aligned with these holes. By locating a photodetector element 332 adjacent to the sProcket hole and by sensing the crossing of a pre-set threshold when the light is near its maximum intensity, the remainder of photodetector elements 132 of photodetector array 131 are strobed and the information content thereby ascertained.

Figures 4, 5:
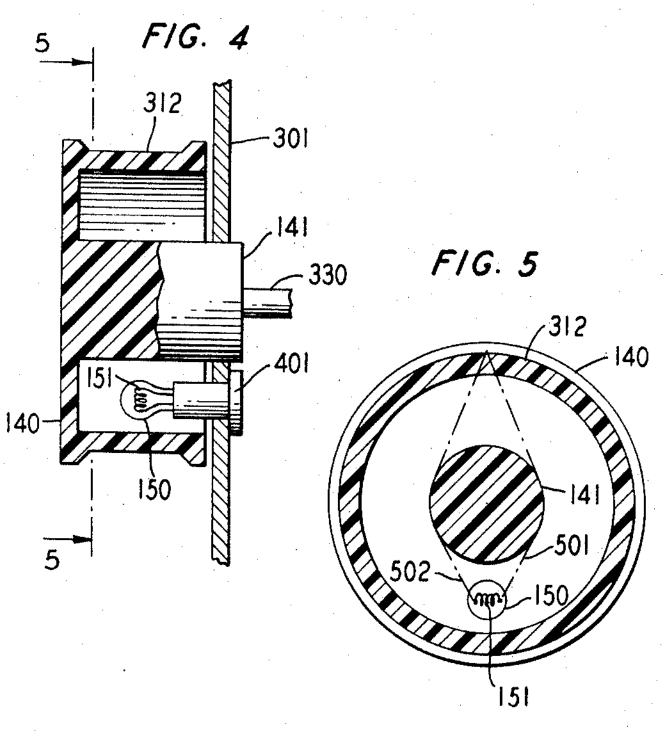
FIG. 4 is a partial side view of the invention showing an alternate location for the light source.
FIG. 5 is a partial front view of the transparent drive wheel in the embodiment shown in FIG. 4 illustrating the cylindrical lens operation.

A further embodiment of the invention is shown by the partial side view of FIG. 4 and the partial front view of FIG. 5 wherein light source 150 is mounted in socket 401 which in turn is attached to frame 301 in the space between hub 141 and the rim of drive wheel 140. Light source 150 lies in the plane containing photodetector array 131 and the axis of rotation of drive wheel 140. Light beam 154 is radiated by filament 151 of light source 150 and impinges on the highly polished surface of hub 141. Hub 141 acts as a cylindrical lens and focuses the light into a narrow strip of uniform intensity across the width of highly polished surface 312 on the rim of drive wheel 140. From this point the operation of the tape reader is the same as hereinbefore described.

Figure 6:
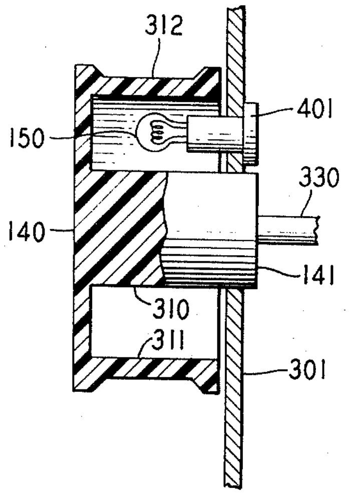
FIG. 6 is a partial side view of the transparent drive wheel illustrating a third arrangement for the light source.

Another embodiment of the invention is illustrated by the partial side view shown in FIG. 6. In this embodiment light source 150 is mounted in socket 401 which is then attached to frame 301 in the space between hub 141 and the rim of drive wheel 140. Since light source 150 is above hub 141, no focusing advantage is gained through the cylindrical lens action of hub 141. As a result the intensity of the light illuminating surface 312 on the rim of drive wheel 140 may be somewhat reduced. In all other aspects the operation of this embodiment is the same as that hereinbefore described.

Figure 7:
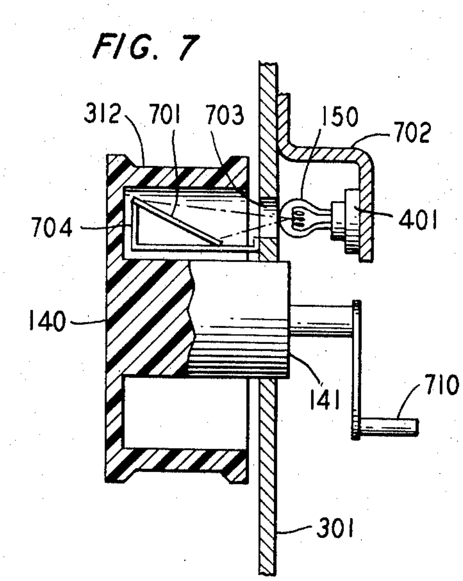
FIG. 7 is a partial side view of the transparent drive wheel illustrating a fourth arrangement for the light source, and an alternate means for supplying rotational motion to the tape drive mechanism.

Still another embodiment of the invention is illustrated by the partial side view shown in FIG. 7 wherein light sour9e 150 is mounted in socket 401 with socket 401 being in turn mounted on bracket 702. Bracket 702 is in turn attached to frame 301. Light from source 150 issues through aperture 703 in frame 301, strikes a mirror 701 and io reflected to surface 312 on the rim of drive wheel 140. Mirror 701 is mounted in the space between hub 141 and the rim of drive wheel 140 on bracket 704 which is attached to frame 301. Mirror 701 is positioned at approximately a 45 degree angle with the axis of rotation of drive wheel 140, thereby causing the light incident thereon to be reflected so as to be nearly normal to surface 312 on the rim of drive wheel 140. As before, since light source 150 is located above hub 141, no focusing advantage due to the hub is achieved. In all other aspects the operation of this embodiment of the invention is the same as that of the preferred embodiment.

An alternate means for supplyinG rotational motion to transparent drive wheel 140 is through a hand operated crank arrangement 710 as shown in FIG. 7. The crank arrangement 710 is equally adaptable to any of the aforementioned embodiments. This type of rotational arrangement permits portable operation under less than ideal operating conditions.

In all cases it is understood that the above described embodiments are illustrative of but a small number of the many possible specific embodiments which can represent applications of the principles of the invention. Thus, numerous and varied other arrangements can readily be devised in accordance with these principles by those skilled in the art without departing from the spirit and scope of the invention.

What is claimed is:

1. Apparatus for reading information coded holes in a record tape that is subject to transverse and skew shifts in position with regard to the longitudinal direction of motion comprising:

a rotatable transparent drive wheel, said drive wheel including a hub having a polished outer surface and an outer rim having an outer surface and an inner surface concentric with said outer surface, both of said rim surfaces being polished, with said outer rim surface having a width approximately equal to the width of said record tape and having first and second beveled edges for maintaining said record tape in lateral alignment, a plurality of photodetection circuits arranged in a linear array parallel to the rotational axis of said drive wheel and adjacent to said outer rim, means for pivotally mounting said array of photodetection circuits at a point along the periphery of said drive wheel, means for urging said record tape into frictional engagement with said outer rim surface and between said first and second beveled edges, a source of light, means for mounting said source of light along a diameter of said wheel and opposite to said array of photodetection circuits with said hub lying between said light source and said photodetection circuits, and cylindrical lens means, included in said polished hub of said transparent drive wheel, for focusing light from said source into a strip of illumination on said record tape with said focused light being detected by said array of photodetection circuits after passing through said holes in said record tape whereby said record tape is read.

2. The apparatus in accordance with claim 1 wherein the mounting means for the source of light is external to said drive wheel and diametrically opposite to said light detecting means, with said mounting means lying in a plane containing said rotational axis of said drive wheel and said photodetection circuits.

3. The apparatus in accordance with claim 1 wherein the mounting means for the source of light is located in a hollow space between said hub and said inner rim surface of said drive wheel with said rotational axis of said drive wheel lying between said mounting means and said photodetection circuits with said mounting means, said rotational axis and said photodetection circuits lying in a common plane.

4. The apparatus in accordance with claim 1 wherein the means for urging the record tape into frictional engagement with the outer rim surface of the drive wheel is comprised of a first pressure roller, means for pivotally mounting said first pressure roller whereby said record tape is brought into physical contact with said drive wheel at the tape input point, a second pressure roller, means for pivotally mounting said second pressure roller whereby said record tape is held in position on said drive wheel as said tape passes between said light projecting means and said light detecting means, means for pivotally mounting said light detecting means, and means for toggling said first and second pressure rollers and said light detecting means between first and second stable positions about the periphery of said drive wheel.

5. The apparatus in accordance with claim 4 wherein the means for pivotally mounting the first pressure roller is comprised of a rigid support member, a spring having a tension sufficient to overcome the inertia of said record tape, and means for attaching said spring to said support member and to said mounting means for said light detecting means.

6. The apparatus in accordance with claim 4 wherein the means for pivotally mounting the second pressure roller is comprised of a rigid support member, a spring having a tension sufficient to override the centrifugal force imparted to said record tape by the rotational motion of said drive wheel, and means for attaching said spring to said support member and to said mountinG means for said light detecting means.

7. The apparatus in accordance with claim 4 wherein the means for toggling the first and second pressure rollers between first and second stable positions is comprised of a first spring coupling said first pressure roller mounting means and said mounting means for said light detecting means, said first spring having a point of maximum extension between said first and second stable positions, and a second spring coupling said second pressure roller mounting means and said mounting means for said light detecting means with said second spring having a tension approximately equal to twice that of said first spring, said second spring having a point of maximum extension between said first and second stable positions.

8. In combination, a paper record tape having a variable center of mass along its length resulting from a nonsymmetrical information-coded hole pattern punched therein, a rotatable transparent drive wheel, said drive wheel including a hub having a polished outer surface and an outer rim having an outer surface and an inner surface concentric with said outer surface, both of said rim surfaces being polished, with said outer rim surface having raised beveled edges of a larger diameter than the diameter of said drive wheel with said bevels extending inward toward an intermediate part of the outer rim surface to define a rim portion of substantially the same width as said tape with said raised beveled edges preventing lateral motion of said tape, means for urging said paper record tape into frictional engagement with said outer rim surface of said drive wheel between said beveled edges whereby longitudinal motion between said beveled edges and said tape is eliminated, a plurality of photodetection circuits arranged in a linear array with said array lying in a plane parallel to the rotational axis of said drive wheel, means for pivotally mounting said array of photodetection circuits at a point along the periphery of said drive wheel, a source of light, means for mounting said source of light diametrically opposite to said array of photodetection circuits with said hub being between said light source and said photodetection circuits, and cylindrical lens means, included in said polished hub of said transparent drive wheel, for focusing light from said source into a strip of illumination on said record tape with said focused light being detected by said array of photodetection circuits after passing through said holes in said record tape whereby said record tape is read.

* * * * *